United States Patent
Tanabe

(10) Patent No.: US 10,620,020 B2
(45) Date of Patent: Apr. 14, 2020

(54) SENSOR UNIT THAT DETECTS A STRIKE

(71) Applicant: Yamaha Corporation, Shizuoka-ken (JP)

(72) Inventor: Emi Tanabe, Hamamatsu (JP)

(73) Assignee: YAMAHA CORPORATION, Shizuoka-Ken (JP)

( * ) Notice: Subject to any disclaimer, the term of this patent is extended or adjusted under 35 U.S.C. 154(b) by 274 days.

(21) Appl. No.: 15/842,785

(22) Filed: Dec. 14, 2017

(65) Prior Publication Data
US 2019/0186959 A1 Jun. 20, 2019

(51) Int. Cl.
*G01D 11/16* (2006.01)
*G10H 3/14* (2006.01)
*G01H 11/08* (2006.01)

(52) U.S. Cl.
CPC ............. *G01D 11/16* (2013.01); *G10H 3/143* (2013.01); *G10H 3/146* (2013.01); *G01H 11/08* (2013.01); *G10H 2220/525* (2013.01); *G10H 2230/325* (2013.01)

(58) Field of Classification Search
CPC ........ G01D 11/16; G10H 3/146; G10H 3/143; G01H 11/08
USPC .......................................................... 84/743
See application file for complete search history.

(56) References Cited

U.S. PATENT DOCUMENTS

| | | | | |
|---|---|---|---|---|
| 4,947,725 A * | 8/1990 | Nomura | ................ | G10D 13/024 84/723 |
| 5,262,585 A * | 11/1993 | Greene | ................ | G10H 1/0066 84/645 |
| 5,965,834 A * | 10/1999 | Suenaga | ................ | G10D 13/06 84/422.3 |
| 6,576,829 B1 * | 6/2003 | Hart | ........................ | G10H 3/146 84/104 |
| 7,196,261 B2 * | 3/2007 | Suenaga | ................ | G10H 3/146 310/331 |
| 7,473,834 B2 * | 1/2009 | Yoshino | ................... | G10H 1/32 84/402 |
| 7,488,887 B2 * | 2/2009 | Mori | ..................... | G10D 13/024 84/723 |
| 7,655,857 B2 * | 2/2010 | Yoshino | ................... | G10H 1/34 84/723 |
| 8,946,536 B2 * | 2/2015 | Field | ...................... | G10H 3/146 84/723 |
| 9,053,693 B1 * | 6/2015 | Wei | .......................... | G10H 3/00 |

(Continued)

FOREIGN PATENT DOCUMENTS

JP 5194318 B2 5/2013
JP 2013-109139 A 6/2013

(Continued)

*Primary Examiner* — David S Warren
*Assistant Examiner* — Christina M Schreiber
(74) *Attorney, Agent, or Firm* — HEA Law PLLC

(57) ABSTRACT

A sensor unit, which is used for detecting a vibration of an object that is supported by a stand, comprises: a sensor board having a contact area that is configured to contact a lower surface of the object; a sensor that is configured to detect a vibration of the object and is fixed to the sensor board; a bearing that is fixed to the sensor board and has a through-hole; and a base that has a shaft that is inserted in the through-hole of the bearing. An outer configuration of the through-hole of the bearing is structured to substantially correspond to an outer configuration of the shaft of the base.

20 Claims, 14 Drawing Sheets

(56) References Cited

U.S. PATENT DOCUMENTS

| | | | | |
|---|---|---|---|---|
| 9,165,544 | B2* | 10/2015 | Yoshino | G10H 3/146 |
| 9,336,759 | B2* | 5/2016 | Mori | G10H 1/32 |
| 9,792,890 | B2* | 10/2017 | Yoshino | G10H 1/32 |
| 9,842,574 | B2* | 12/2017 | McFadden | G10D 13/026 |
| 10,096,309 | B2* | 10/2018 | Suitor | G10H 3/188 |
| 2002/0059861 | A1* | 5/2002 | Yoshino | G10D 13/024 |
| | | | | 84/402 |
| 2003/0200860 | A1* | 10/2003 | Toda | G10H 1/32 |
| | | | | 84/746 |
| 2005/0145101 | A1* | 7/2005 | Yoshino | G10H 1/32 |
| | | | | 84/723 |
| 2006/0021495 | A1* | 2/2006 | Freitas | G10H 3/10 |
| | | | | 84/723 |
| 2013/0125735 | A1* | 5/2013 | Mori | G10H 3/146 |
| | | | | 84/723 |
| 2016/0210945 | A1* | 7/2016 | Tanabe | G10D 13/06 |
| 2017/0116972 | A1* | 4/2017 | Yoshino | G10H 1/32 |
| 2018/0277070 | A1* | 9/2018 | Mori | G10D 13/024 |
| 2019/0186959 | A1* | 6/2019 | Tanabe | G01D 11/16 |

FOREIGN PATENT DOCUMENTS

| | | | |
|---|---|---|---|
| JP | 5261676 B2 | | 8/2013 |
| JP | 2016-180775 A | | 10/2016 |
| JP | 2016180775 A | * | 10/2016 |

* cited by examiner

SENSOR UNIT THAT DETECTS A STRIKE

TECHNICAL FIELD

The present invention relates to a sensor which detects a vibration of an object such as a cymbal and transfers generated signals to a device that generates sound data based on the received signal when the object such as the cymbal is struck.

BACKGROUND

An electronic cymbal is one example which vibrates when struck. In the electronic cymbal, an electronically generated sound can be added to an original acoustic sound generated by a cymbal, thereby enhancing the overall quality of the sound. To generate the electronic sound portion, a sensor is used to detect a vibration of the cymbal and generate signals based on the detected vibration. The generated signals are transferred to a device which generates a sound based on the received signals. The sensor is normally attached to the cymbal or a cymbal stand.

For example, U.S. Pat. No. 7,488,887 discloses that a sensor is attached to a cymbal via an attachment part by a screw or with a weld (see FIG. 14). Japanese Pat. No. 5,194,318 also discloses attaching a pick-up to a plate, while the plate is attached to a lower surface of the cymbal by a screw. However, in these structures, the sensor and the pick-up rotate when the cymbal rotates. This means that even when the cymbal is struck at a same point, the sensor may rotate and thus a distance between the sensor and the striking point of the cymbal change. Here, the same point means a same point when viewed from a performer's view point. This adversely affects signals generated by the sensor because the signals generated by the sensor change depending on the distance between the sensor and the striking point of the cymbal. Further, when the sensor or the pick-up rotates, a cable connected to the sensor or the pick-up also rotates and thus, the cable may wind around other components including a stand that supports the cymbal. If this situation occurs, the cable receives a bending stress and a torsion stress, and thus the cable may be damaged. In addition, when the sensor, or the plate to which the sensor is attached, is attached to the cymbal by a screw, it is likely that the screw can loosen due to the vibration of the cymbal. Further, it is necessary to form a hole to the cymbal. Similarly, when using welding to secure an attachment of the sensor, additional work must be done to the cymbal. Further, when the sensor or the plate to which the sensor is attached to the cymbal is done so by welding, the sensor cannot not be replaced or moved to a different location or orientation.

Further, Japanese Patent Application Publication No. 2013-109139 discloses that a piezoelectric sensor is disposed within a sensor attachment part, which is sandwiched by two buffer parts. However, in this structure, when the cymbal rotates, the sensor attachment part including the piezoelectric sensor rotates due a load of the cymbal against the buffer part. Thus, similar to the above applications, a distance between the piezoelectric sensor and the striking point of the cymbal changes, even when the cymbal is struck at a same point when viewed from a performer's view point. Further, because the sensor attachment part including the piezoelectric sensor rotates, the above problems relating to the cable also may occur. In addition, the 2013-109139 application discloses a rod that penetrates a center of the attachment part and the piezoelectric sensor. Applicant also proposed attaching the sensor to a washer (see Japanese Patent Application Publication No. 2016-180775). However, this application does not address the above issue.

SUMMARY

In view of the above circumstances, an object of the present application is to provide a sensor unit which includes a sensor that is configured to detect a vibration of an object, where the sensor unit does not rotate, even when the object rotates in a circumferential direction, thereby assuring that a distance between the sensor and the striking point of the object remains unchanged when the object is struck. Another object is to provide a sensor unit which includes sensor that is configured to detect a vibration of an object, where the sensor unit does not rotate in the circumferential direction and follows an up and down movement of the object when the object is struck, thereby assuring that a distance between the sensor and the striking point of the object remains unchanged when the object is struck. Another object is to provide a sensor board that stably contacts and supports the object even when the object rotates in the circumferential direction and moves in a generally up and down direction. Further, another object is to provide the sensor unit and the sensor board which are used for any objects and the stands that support the objects, and are replaceable, without requiring any specific structure or arrangement of the object and the stand. Another object is to provide a sensor unit which includes a sensor that is configured to detect a vibration of an object, where a cable connected to the sensor do not rotate, even when the object rotates in a circumferential direction, thereby preventing the cable from winding around other components.

To achieve these objects, one aspect of the invention relates to a sensor unit that is configured to be used for detecting a vibration of an object that is supported by a stand, comprising: a sensor board having a contact area, the contact area being configured to contact a lower surface of the object when the sensor board and the object are attached to the stand; a sensor that is fixed to the sensor board, the sensor being configured to detect the vibration of the object when the object is struck, the sensor being configured to receive a cable through which the detection result is transmitted; a bearing that is fixed to the sensor board and has a through-hole; and a base that is configured to be detachably fixed to the stand, the base having a shaft that extends upward and is inserted in the through-hole of the bearing: wherein an outer configuration of the through hole of the bearing is structured to substantially correspond to an outer configuration of the shaft of the base.

One aspect of the invention relates to a sensor unit that is configured to be used for detecting a vibration of an object that is supported by a stand, comprising: a sensor board having a contact area, the contact area being configured to contact a lower surface of the object when the sensor board and the object are attached to the stand; a sensor that is fixed to the sensor board, the sensor being configured to detect a vibration of the object when the object is struck, the sensor being configured to receive a cable through which the detection result is transmitted; a bearing that is fixed to the sensor board and has a through-hole; and a base that is configured to be detachably fixed to the stand, the base having a shaft that extends upward and is inserted in the through-hole of the bearing; wherein: an outer configuration of the through-hole of the bearing is structured to substantially correspond to an outer configuration of the shaft of the base, and the bearing is made of a material that is more flexible than the sensor board.

One aspect of the invention relates to a sensor unit that is configured to be used for detecting a vibration of an object that is supported by a stand, comprising: a sensor board having a protrusion and a through-hole; a sensor that is fixed to the sensor board, the sensor being configured to detect a vibration of the object when the object is struck, the sensor being configured to receive a cable through which the detection result is transmitted; and a base that is configured to be detachably fixed to the stand, the base having a shaft that extends upward and is inserted in the through-hole of the bearing; wherein the protrusion has an annular shape when view from a top, and an upper surface of the annular shaped protrusion is configured to contact a lower surface of the object when the sensor board and the object are attached to the stand.

Other objects and aspects of the invention will be understood by the detailed description of the invention.

DETAILED DESCRIPTION OF THE INVENTION

[Overview]

Figure 1:
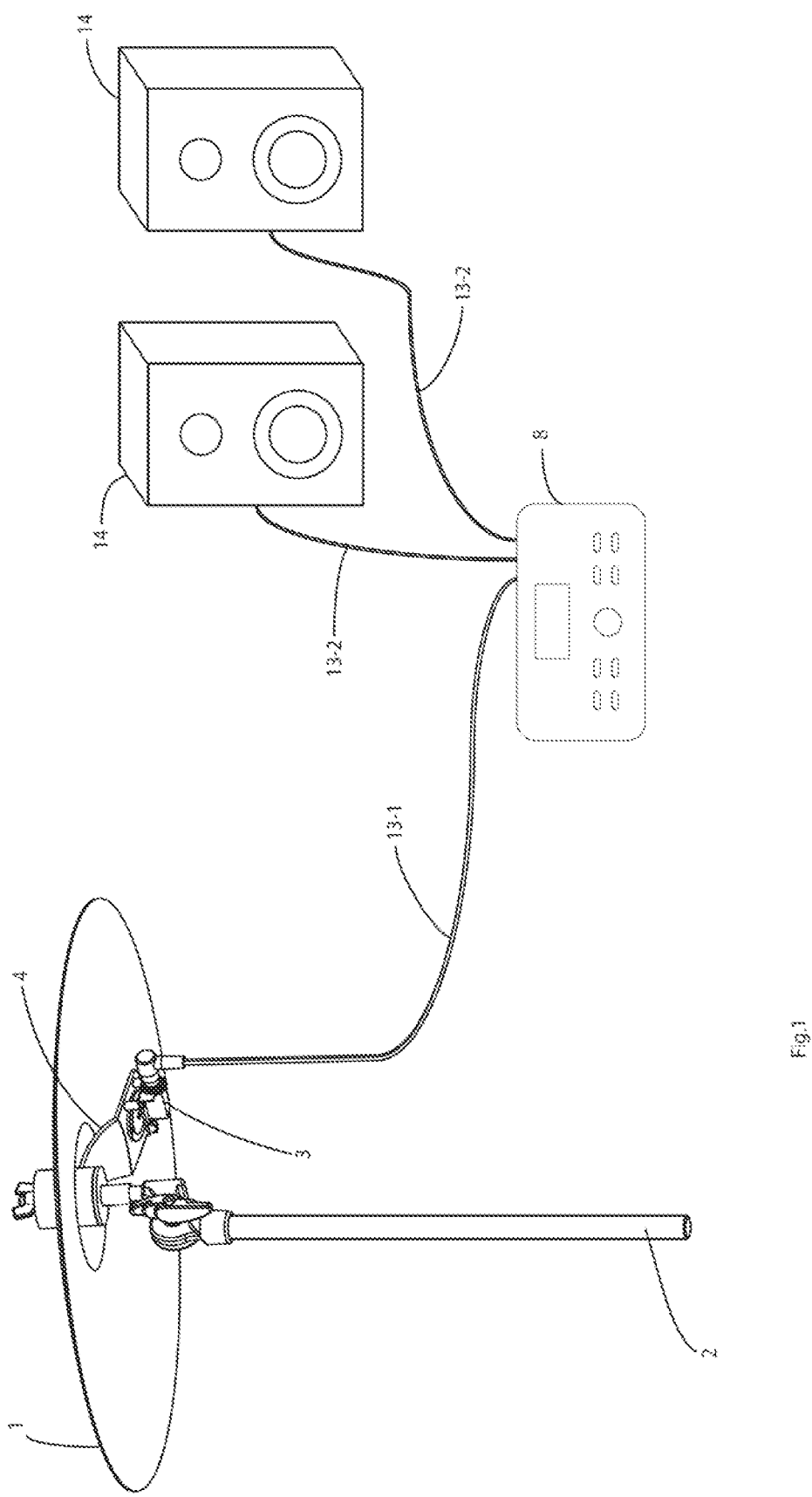
FIG. 1 is an overview showing the relationship between the sensor and other components.
Figure 2:
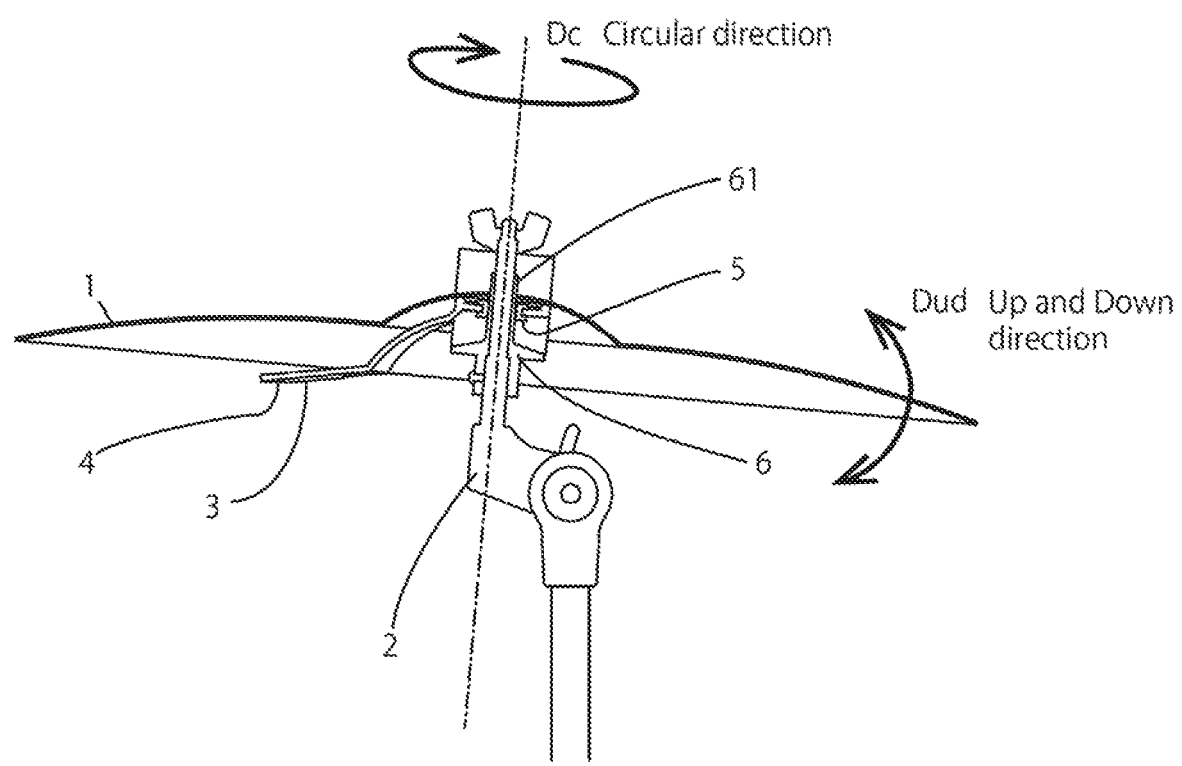
FIG. 2 is a side view showing the circular direction and the up and down direction.

An overview of this application is explained by using FIGS. 1 and 2. A cymbal 1 is an acoustic cymbal made of metal. The cymbal 1 is attached to a shaft 61 of a base 6 so that the cymbal 1 is rotatable in a circumferential direction around the shaft 61 of the base 6, and is movable in an up and down direction. Thus, an outer edge of the cymbal 1 can rotate in an up and down direction, while a center of the cymbal 1 remains attached to the shaft 61 of the base 6. A sensor 3 that detects a vibration of the cymbal 1 is fixed to a sensor board 4. A bearing 5 is fixed to the sensor board 4, while the bearing 5 is arranged so that the bearing 5 does not rotate with respect to the base 6. Thus, the sensor board 4 and the sensor 3, which is fixed to the sensor board 4, do not rotate with respect to the base 6. The base 6 is fixed to a cymbal stand 2 so that the base 6 does not rotate with respect to the cymbal stand 2. Thus, the sensor board 4 and the sensor 3 are arranged so that they do not rotate in the circumference direction with respect to the cymbal stand 2 even when the cymbal 1 rotates in the circumferential direction. The detailed structures of these components and how they work will be described later.

The sensor 3 is a vibration detecting sensor which detects a vibration of the cymbal 1 when the cymbal 1 is struck with a drum stick or the like. After detecting the vibration of the cymbal 1, the sensor 3 generates a signal based on the detected vibration, and transmits the generated signal to a device 8 through a cable 13-1. The cable 13-1 is detachably connected to the sensor 3. The device 8 generates audio data based on the received signal, and the generated audio data is sent to speakers 14, 14 through cables 13-2, 13-2. For example, a piezoelectric sensor, which uses a piezoelectric effect, may be used as the sensor 3. The piezoelectric sensor detects the vibration of the cymbal 1, and converts the detected vibration to a voltage, thereby detecting the vibration electrically. The sensor 3 is not limited to the piezoelectric sensor, and other types of sensor can be used as long as they detect the vibration of the cymbal 1. For example, a conductive type sensor, which uses a coil and a spring, and a strain gauge type sensor may also be used.

Striking Points and Detecting Results

The relationship between the striking points of the cymbal and detection by the sensor 3 will be explained, using FIGS. 3 and 4.

Figure 3:
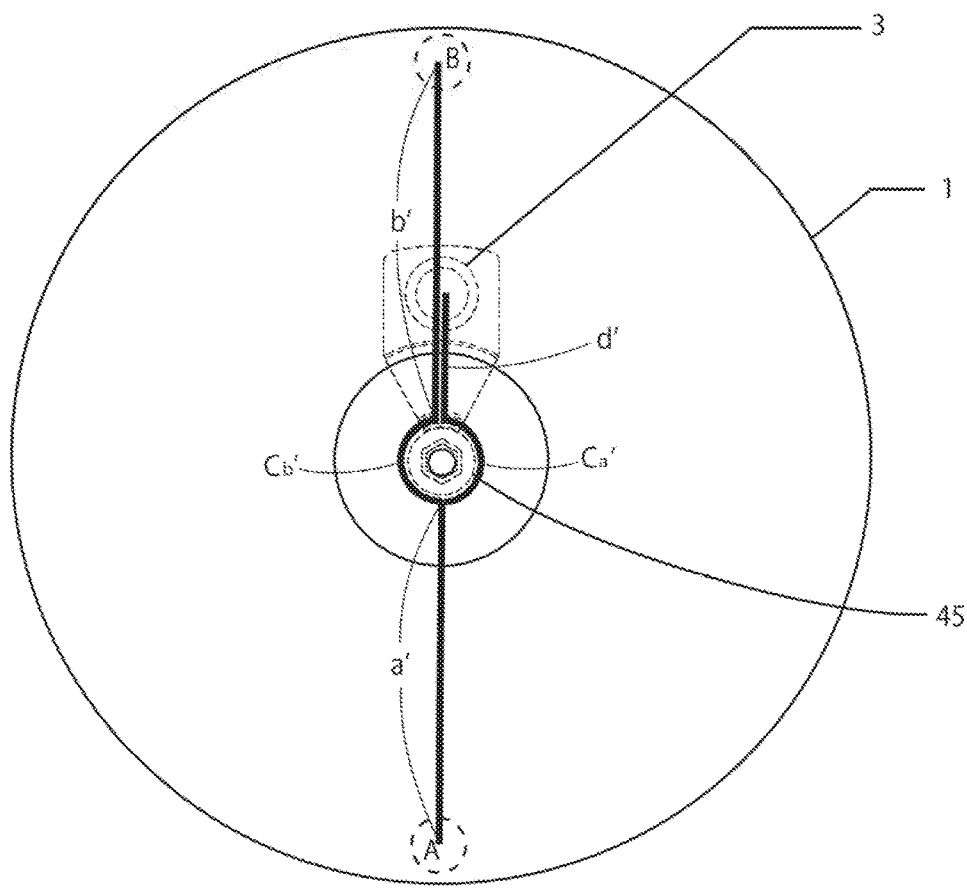
FIG. 3 shows different striking points of the cymbal.

FIG. 3 is a top view of the cymbal 1 and shows the different striking points A, B. The cymbal 1 is supported by an annular protruded portion 45. An upper surface of the annular protruded portion 45 contacts a lower surface of the cymbal 1, thereby the annular protruded portion 45 supports the lower surface of the cymbal 1. The sensor 3 is disposed below the lower surface of the cymbal 1. The details of these structures will be explained later. When the cymbal 1 is struck at point A, a vibration of the striking point A is transferred to the sensor 3 through the following path: from the striking point A to a lower portion of the annular protruded portion 45, from the lower portion of the annular protruded portion 45 to an upper portion of the annular protruded portion 45 along a circumferential direction, and from the upper portion of the annular protruded portion 45 to the sensor 3. Thus, a distance from the striking point A to the sensor 3 is (a'+Ca'/or Cb'+d'). On the other hand, when the cymbal 1 is struck at point B, the vibration of the stringing point B is transferred to the sensor 3 through the following path: from the striking point B to the upper portion of the annular protruded portion 45, and from the upper portion of the annular protruded portion 45 to the sensor 3. Thus, a distance from the striking point B to the sensor 3 is (b'+d'), where b' is equal to a'. Thus, the distance between the striking point A and the sensor 3 is longer than the distance between the striking point B and the sensor 3. In this embodiment, the sensor 3 is a piezoelectric sensor.

Figure 4:
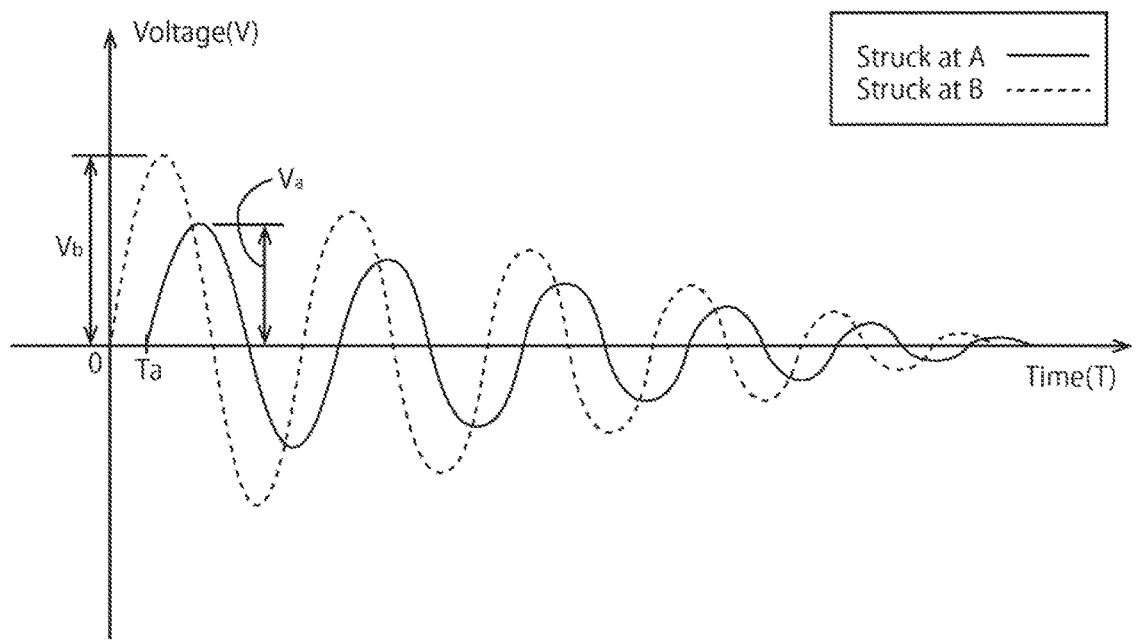
FIG. 4 shows graphs showing the detection results by the sensor when the cymbal is struck at points shown in FIG. 3.

FIG. 4 shows the detection by the sensor 3 when the cymbal 1 is struck at point A and point B, where the cymbal 1 is struck with the same force. A solid line shows an input to the sensor 3 when the cymbal 1 is struck at point A, while a dotted line shows the input to the sensor 3 when the cymbal 1 is struck at point B. As shown in FIG. 4, the sensor 3 starts detecting the vibration of the cymbal 1 at T=0 when the cymbal is struck at point B, and the sensor 3 starts detecting the vibration of the cymbal 1 at T=Ta when the cymbal 1 is struck at point A. Thus, when the cymbal 1 is struck at point A, the detection by the sensor 3 is delayed by a time Ta compared to when the cymbal 1 is struck at point B. In addition, an input voltage Vb to the sensor 3 when the cymbal is struck at point B is larger than an input voltage Va to the sensor 3 when the cymbal 1 is struck at point A. In other words, even when the cymbal is struck with the same force, the sensor's detection result changes depending on the distance between the sensor and the striking point of the cymbal. This detection results also similarly affect the outputs by the sensor 3.

On the other hand, for a percussion instrument such as the cymbal, it is important that the sound produced by the device 8 remains constant when the cymbal 1 is struck at the same point and with the same force. Here, the same point means a same point when viewed from a performer's view point. Thus, when the cymbal 1 is struck at the same point with the same force, the sensor 3 should remain at the same place so that the distance between the sensor 3 and the striking point is unchanged. This ensures that the sensor 3 outputs a consistent signal to the device 8, for corresponding consistent strikes on the cymbal 1.

Thus, in this embodiment, the sensor board 4, where the sensor 3 is fixed, is arranged so that the sensor board 4 does not rotate in a circumferential direction even when the cymbal 1 rotates, thereby assuring the same detection result by the sensor 3 when the cymbal 1 is struck at the same point with the same force.

In this application, the circumferential direction means a direction Dc which is shown in FIG. 2, and the up and down direction means a direction Dud which is shown in FIG. 2. For example, the cymbal 1 rotates in the circumferential direction around the shaft 61 of the base 6, and moves in the up and down direction around the shaft 61 of the base 6. Further, as explained above, the same point means a same point when viewed from a performer's view point.

A First Embodiment

As shown in FIGS. 5-9, a sensor unit 7 comprises the sensor 3, the sensor board 4, the bearing 5 and the base 6. The sensor 3 and the sensor board 4 are arranged so that they do not rotate in the circumference direction, as explained below.

Sensor and the Sensor Board

Figure 7:
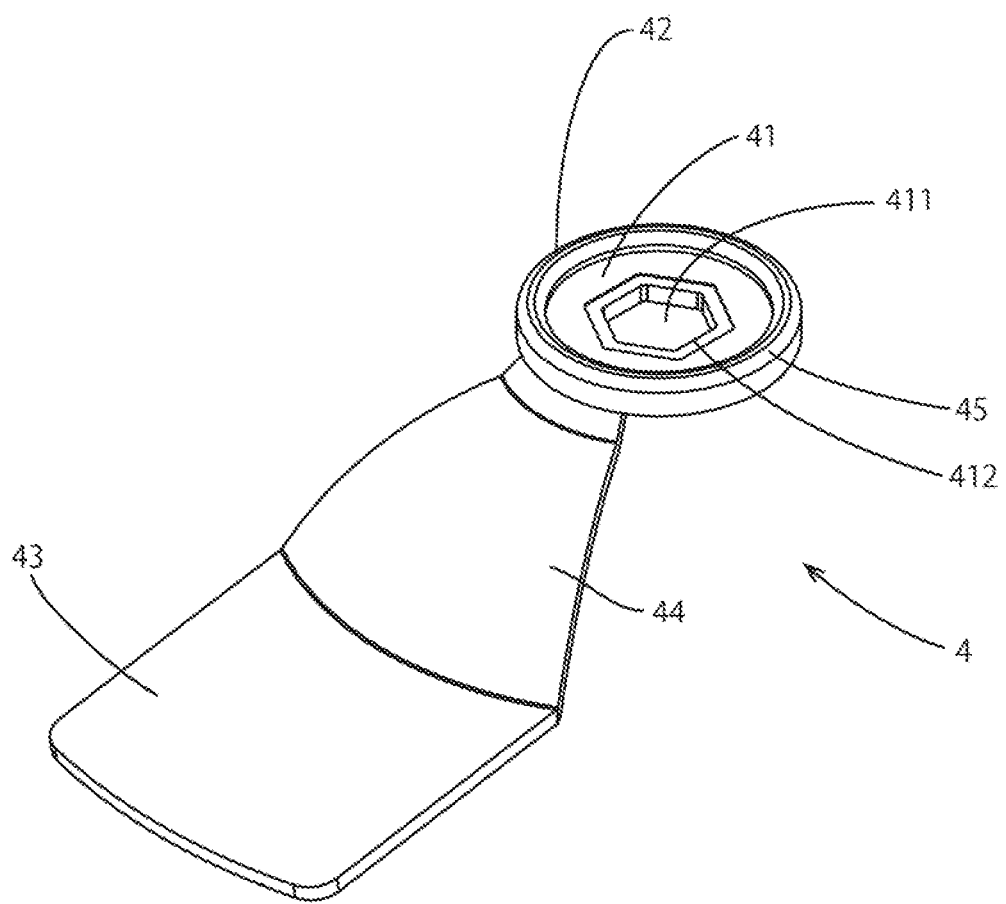
FIG. 7 is an overview of the sensor board.

As shown in FIG. 7, the sensor board 4 includes a disk portion 41 which has a contact area 42 at an edge of the disk portion 41, a flat plate 43, and a connecting plate 44 that connects the disk portion 41 and the flat plate 43. The sensor 3 is fixed to a lower surface of the flat plate 43. The sensor 3 can be fixed by an adhesive or a double-sided tape, for example. By fixing the sensor 3 to the flat plate 43, attaching the sensor 3 to the sensor board 4 is performed easily. It is also possible to fix the sensor 3 to an upper surface of the flat plate 43.

Figure 6:
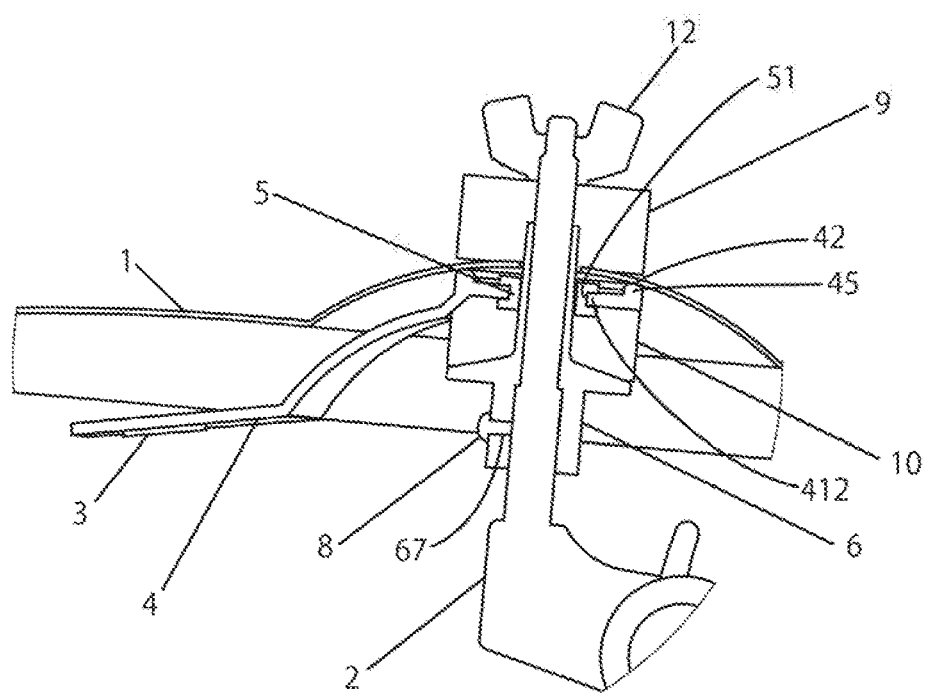
FIG. 6 is an enlarged view of portion A in FIG. 5.
Figure 9:
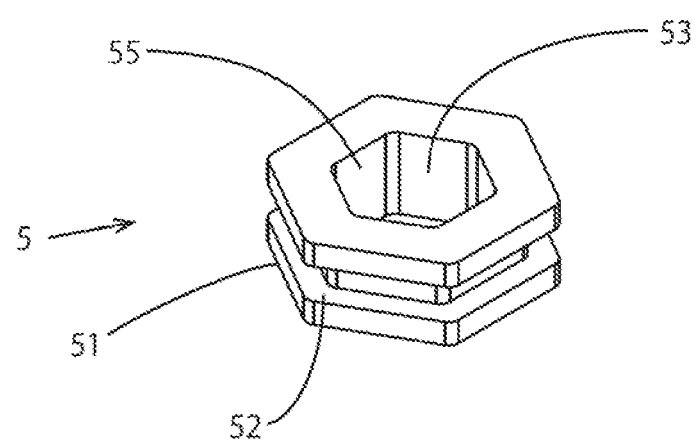
FIG. 9 is an over view of the bearing.
Figure 10B:
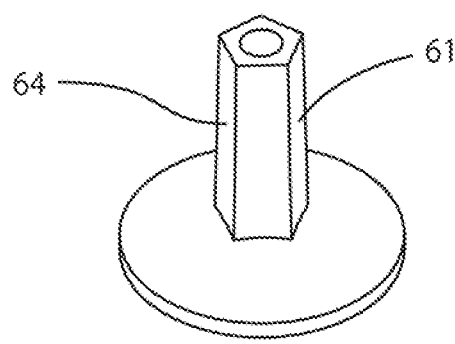
FIG. 10A and FIG. 10B are other examples of the bearing and the base.
Figure 10A:
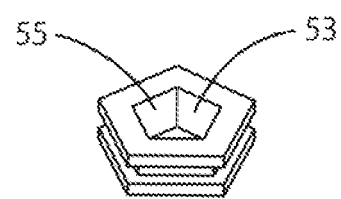
Figure 11B:
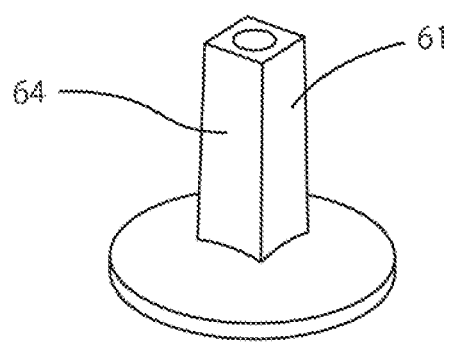
FIG. 11A and FIG. 11B are other examples of the bearing and the base.
Figure 11A:
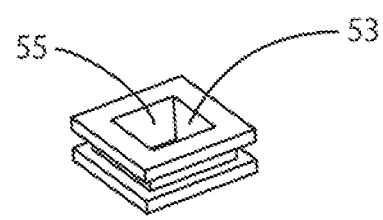

As shown in FIGS. 6 and 7, a circumferential portion of the disk portion 41 protrudes upwards and forms the annular protruded portion 43. An upper surface of the annular protruded portion 45 works as a contact area 42 and contacts a lower surface of the cymbal 1 when the cymbal 1 and the sensor unit 7 are attached to the cymbal stand 2. When the cymbal 1 is struck, the sensor 3 detects the vibration of the cymbal 1 via the contact area 42. Because the contact area 42 has an annular shape, the contact area 42 always contacts the lower surface of the cymbal 1 even if any part of the cymbal 1 moves in the up and down direction. Thus, the sensor 3 can stably detect the vibration of the cymbal 1. The annular protruded portion 45 is not limited to be formed at the edge of the disk portion 41. Instead, the annular protruded portion 45 may be formed at an inner portion from the edge of the disk portion 41. Further, an inner hole 411 is formed at a central part of the disk portion 41. The inner hole 411 extends in an axial direction of the disk portion 41. Bearing 5, shown in FIG. 9, is located along an outer peripheral portion of the inner hole 411.

Bearing and Base

The bearing 5 is immovably fixed to the disk portion 41. The bearing 5 is formed of an elastic material, such as a rubber and a urethane, and the bearing 5 has more flexibility than the sensor board 4. To secure the bearing 5 to the disk portion 41, the bearing 5 is pressed downward into the inner hole 411 of the disk portion 41. Then, an edge 51 of the bearing 5 is deformed due to its flexibility, and by further pressing the bearing 5, an inner edge 412 of the disk portion 41 is pressed into a groove 52 formed at a side surface of the bearing 5 (see FIGS. 6, 7 and 9). Thereby, the bearing 5 is immovably fixed to the disk portion 41 of the sensor board 4, while the bearing 5 is located along the outer peripheral portion of the inner hole 411. The bearing 5 is removed from the inner hole 411 of the disk portion 41 by pulling upward. A through-hole 53 is formed at a central portion of the bearing 5. The through-hole 53 extends in an axial direction of the bearing 5, and the shaft 61 of the base 6 is inserted into the through hole 53.

Figure 8:
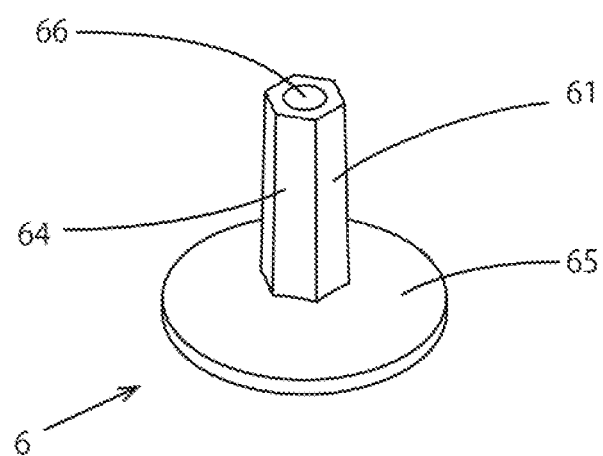
FIG. 8 is an overview of the base.

The through-hole 53 of the bearing 5 has a polygonal shape, and an outer shape of the shaft 61 of the base 6 is also a matching polygonal shape. The shape of the through-hole 53 substantially corresponds to the outer shape of the shaft 61 of the base 6. FIGS. 8, 9 show examples where the through-hole 53 is hexagonal and the outer shape of the shaft 61 of the bearing 6 is hexagonal. Thus, when the shaft 61 of the base 6 is inserted in the through-hole 53 of the bearing 5, the shaft 61 can move in the up and down direction in the through-hole 53, but the bearing 5 cannot rotate with respect to the base 6. Accordingly, the sensor board, which is united with the bearing 5, does not rotate with respect to the shaft 61 of the base 6. Further, the sensor 3 which is immovably fixed to the sensor board 4 also does not rotate with respect to the base 6. In FIGS. 8 and 9, the through-hole 53 and the outer shape of the shaft 61 of the base 6 are hexagonal. However, they are not limited to this shape. For example, as shown in FIGS. 10A and 10B, and FIGS. 11A and 11B, a pentagonal shape or a square shape are also possible. Other shapes are also possible as long as they perform the above intended functions.

Figure 12B:
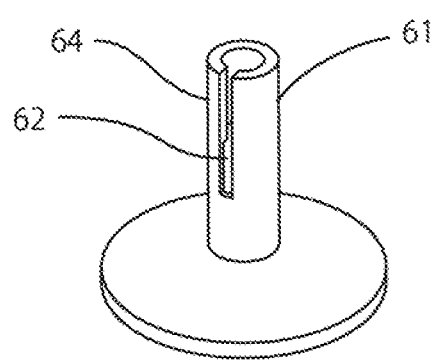
FIG. 12A and FIG. 12B are other examples of the bearing and the base.
Figure 12A:
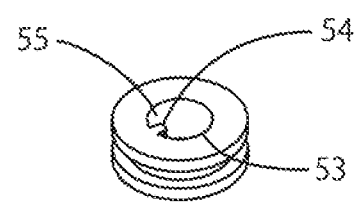
Figure 13B:
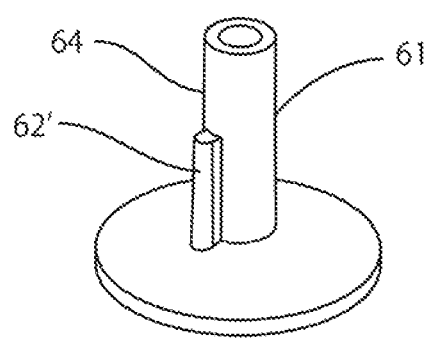
FIG. 13A and FIG. 13B are other examples of the bearing and the base.
Figure 13A:
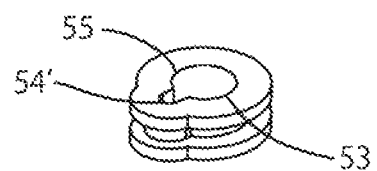

In addition, instead of making the through hole 53 and the outer shape of the shaft 61 polygonal, it is possible to use a convex and a concave. FIGS. 12A and 12B shows that a convex portion 54 is formed on an outer surface of the through-hole 53 and a concave portion 62 is formed on the shaft 61 of the base 6. The concave portion 62 may extend to a bottom of the shaft 61. The concave portion 62 may have any length as long as the concave portion 62 performs the above intended functions. FIGS. 13A and 13B shows that a concave 54' portion is formed on the outer surface of the through hole 53 and a convex portion 62' is formed on the shaft 61.

As it is clear from the above disclosures, an outer configuration 55 of the through-life 53 is configured to substantially correspond to an outer configuration 64 of the shaft 61 of the base 6. Thus, when the shaft 61 of the base 6 is inserted in the through-hole 53 of the bese 5, (i) the shaft 61 of the base 6 is movable in the through-hole 53 of the bearing 5 along a direction in which the through-hole 53 extends and (ii) the bearing 5 does not rotate with respect to the shaft 61 of the base 6. The outer configurations of the through-hole 53 and the shaft 61 are not limited to the above disclosures, and other outer configurations of the through-hole 53 and the shaft 61 may be used as long as they perform the above intended functions.

As shown in FIG. 8, the base 6 includes the shaft 61 and a flange 65. The base 6 has an inner through-hole 66 which extends in an axial direction of the shaft 61, while the shaft 61 is inserted in the through-hole 53 of the bearing 5 as explained above. The inner through-hole 66 is formed at center portions of the shaft 61 and the flange 65, and the shaft 21 of the cymbal stand 2 is inserted in the inner-through hole 66 of the base 6. The shaft 61 of the base 6 extends upwards. The shaft 61 may extends in a vertical direction and may extend obliquely upwards. Further, the shaft 61 may extend in part or in full in a horizontal direction. The shaft 61 may extend in any directions as long as the shaft 21 of the cymbal stand 2 is inserted in the inner through-hole 66 of the base 6. The shaft 61 and an axis of the inner through-hole 66 may extend in the same direction in which the shaft 21 of the cymbal stand 2 extends. A screw hole 67, which extends horizontally, is formed on the base 6. The screw hole 67 extends between an outer surface of the base 6 and the inner through-hole 66. A screw 8 is used to fix the base 6 to the cymbal stand 2. The screw 8 is inserted into the screw hole 67 until a tip of the screw 8 contacts the outer surface of the shaft 21, and a screw threaded portion of the screw 8 is coupled to an internal threaded portion of the screw hole 67, thereby the base 6 is immovably attached to the shaft 21 of the cymbal stand 2. The base 6 is fixed to the cymbal stand 2 so that the base 6 does not move in a direction in which the shaft 21 of the base 2 extends, and the base 6 does not rotate with respect to the shaft 21 of the cymbal stand 2.

Circumferential Movement and a Sensor Unit

As discussed above, the base 6 is immovably fixed to the cymbal stand 2, and the sensor board 4 is attached to the base 6 via the bearing 5 so that the sensor board 4 does not rotate with respect to the shaft 61 of the base 6. Thus, the sensor 3 which is immovably fixed to the sensor board 4 also does not rotate with respect to the base 6 and the cymbal stand 2. Therefore, even when the cymbal 1 rotates in a circumferential direction when struck, the sensor board 4 and the sensor 3 do not rotate. Thus, when the cymbal 1 is struck at the same point, even if the cymbal 1 may rotate in the circumferential direction, the sensor 3 remains at the same place, and thus the distance between the sensor 3 and the striking point of the cymbal 1 remains unchanged. Thus, the sensor 3 generates the same vibration detection results when the cymbal 1 is struck at the same point with the same force.

Further, because the sensor 3 remains at the same place even if the cymbal 1 rotates, the cable 13-1 connected to the sensor 3 also remains at the same place. Thus, the cable 13-1 does not wind around the cymbal stand 2 even if the cymbal 1 rotates. Accordingly, the cable 13-1 does not receive any bending stress or a torsion stress, and thus the cable 13-1 is not damaged. Further, this structure allows preventing a disconnection of the cable 13-1 from the sensor 3 or a breaking of the cable 13-1 between the sensor 3 and the device 8. The disconnection of the cable 13-1 from the sensor 3 and the break of the cable 13-1 may occur if the sensor 3 rotates. However, in this application, these do not occur because the sensor 3 remains at the same place when the cymbal 1 rotates.

The sensor unit 7 comprises the sensor 3, the sensor board 4, the bearing 5 and the base 6. As is clear from the above explanation, only the sensor board 4, the bearing 5 and the base 6 are arranged and structed in the manner described above, but the cymbal 1 and the cymbal stand 2 do not require a specific change or a specific structure. Thus, the sensor board 4, the bearing 5 and the base 6 are used for any cymbal 1 and cymbal stand 2. Further, as explained below, the sensor board 4, the bearing 5 and the base 6 are easily attached to the cymbal stand 2 and are interchangeable. For example, the sensor board 4 can be replaced with another sensor board 4, where another sensor 3, which has a different detection ability from an originally used sensor 3, is fixed. The sensor board 4 may be replaced with another sensor board 4, where the sensor 3 is fixed to another location of the flat plate 43 of the sensor board 4.

Up and Down Movement

Here, the up and down movement of the cymbal 1 and the sensor board 4 will be explained. The bearing 5 plays an important role when the cymbal 1 and the sensor board 4 move in the up and down direction. As discussed above, the bearing 5 is made of an elastic material such as a rubber, or the like. Preferably, the elastic material has a hardness of A20-A50. In this application, it is defined that a predetermined hardness means a hardness of between A20-A50. The hardness of the bearing 5 is decided with the following in mind: the bearing 5 should be flexible enough so that the edge 51 of the bearing 5 is deformed when the bearing 5 is inserted into the inner hole 411 of the disk portion 41, as explained above; and should also be flexible enough to deform and absorb a downward movement of the sensor board 4, which will be discussed below.

Figure 14:
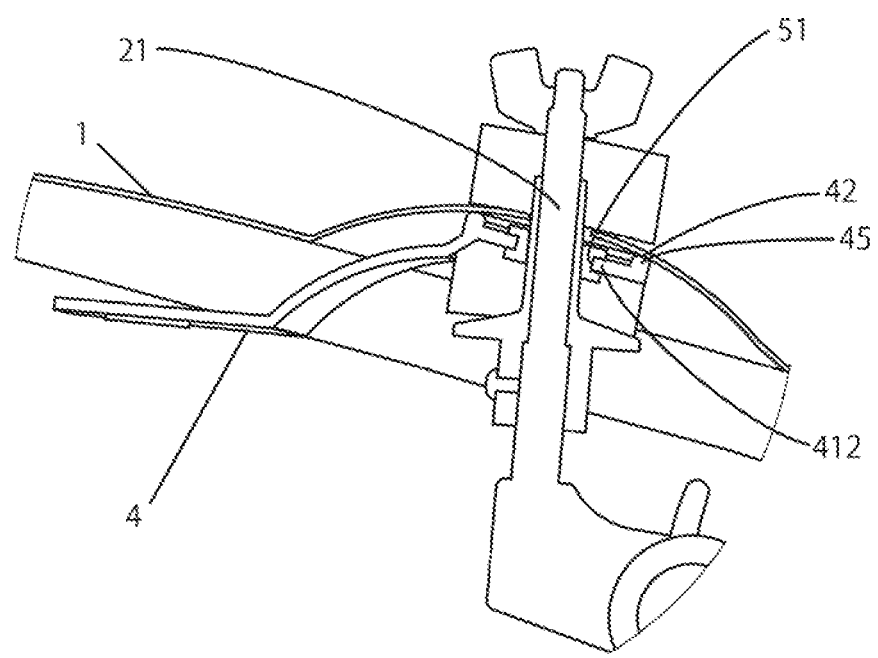
FIG. 14 is a sideview when the cymbal moves downwards.

Each of an upper felt 9 and a lower felt 10 is made of a flexible material and has normally a density of between 20-40 g/cm$^3$. Each of the bearing 5, the upper felt 9 and the lower felt 10 has more flexibility and elasticity than the sensor board 4, the base 6, the cymbal 1 and the cymbal stand 2. The cymbal 1, the sensor board 4 and the bearing 5 are tightly held between the upper felt 9 and the lower felt 10, as discussed below; and the sensor board 1 is attached to the shaft 61 of the base 6 via the bearing 5. Thus, for example, when a portion C (see FIG. 5) of the cymbal 1 is struck with a stick, the cymbal 1 moves downward around a bored hole 11, which is formed at a center of the cymbal 1, from the position shown in FIG. 6 to the position shown FIG. 14. The downward movement of the cymbal 1 is transferred to the sensor board 4 via the contact area 42, and forces the sensor board 4 to move downward. Then, because the sensor board 4 is harder than the bearing 5 and the lower felt 10, the sensor board 4 follows the downward movement of the cymbal 1 by compressing and deforming the bearing 5 and the lower felt 10 by the inner edge 412 and an adjacent portion of the disk portion 41, which are located at a same side with the portion C of the cymbal 1 with respect to the shaft 21 in FIG. 14. In other words, the bearing 5 absorbs the downward movement of the sensor board 4 by deforming, thereby allowing the downward movement of sensor board 4. Because when one side of the cymbal 1 moves downward, other side of the cymbal 1 moves upward. Thus, the sensor board 4 always follows the up and down movement of the cymbal 1. Therefore, even when the cymbal 1 moves in the up and down direction, the distance between the sensor 3 and the striking point remains unchanged. Thus, the same detection result is obtained when the cymbal 1 is struck at the same point with the same force. Any measures may be used to fix the bearing 5 to the sensor board 4 as long as they perform the above function.

Further, the contact area 42 has an annular shape and is arranged to surround the bearing 6, and a center of the annular shaped contact area 42 is disposed along an axis direction of the shaft 61. Thus, the sensor board 4 always follows the up and down movement of the cymbal 1, even if the cymbal 1 is struck any place.

Further, it is obvious from the above disclosures that the distance between the sensor 3 and the same striking point is constant and unchanged even when the cymbal 1 rotates in the circumferential direction and moves in the up and down direction at the same time.

Assembling

Figure 15:
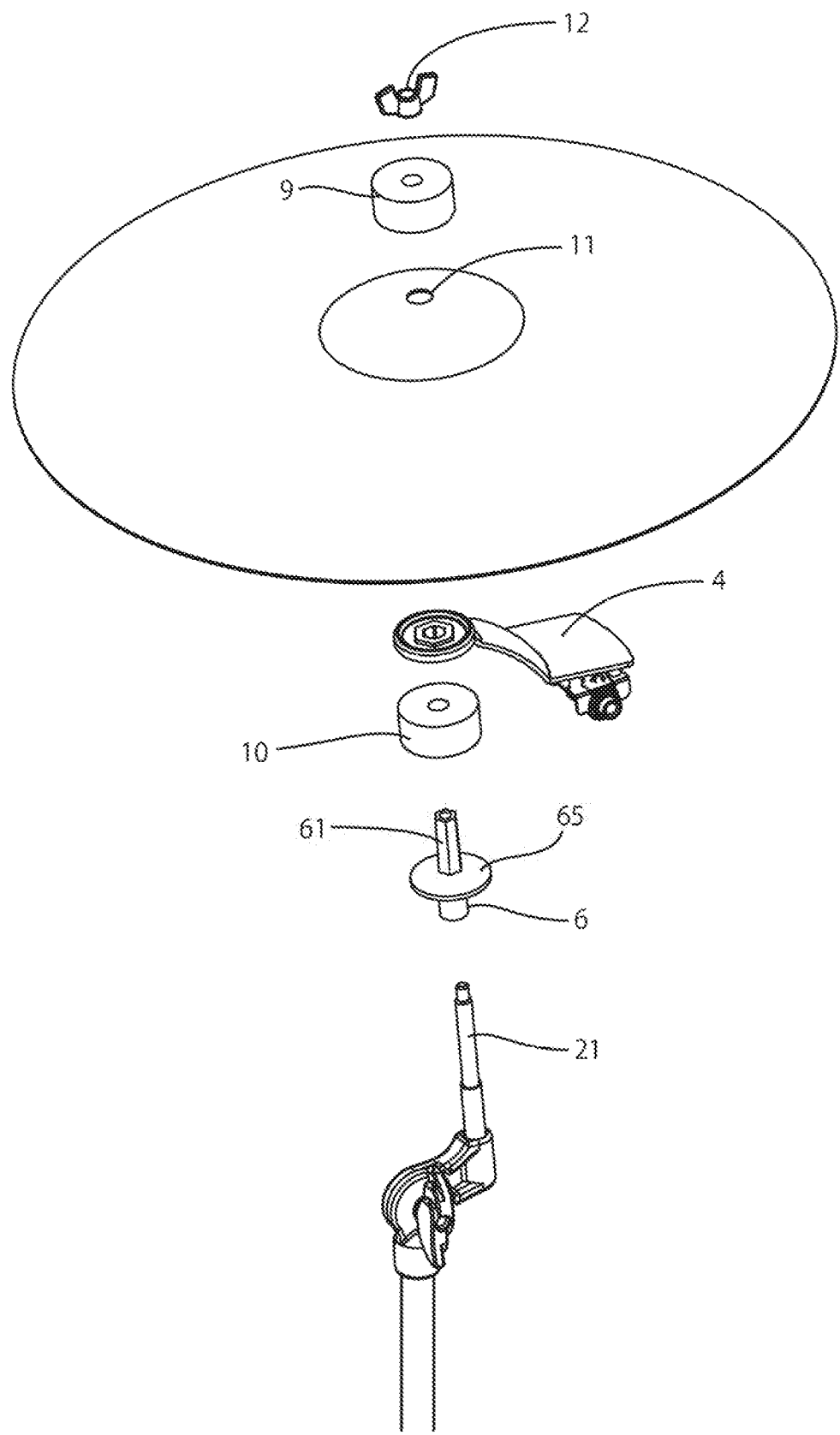
FIG. 15 is an exploded view of the cymbal instrument.

Next, assembling the cymbal instrument and exchanging some parts will be described. FIG. 15 is an exploded view of the cymbal instrument. As shown in FIG. 15, each of the upper felt 9 and the lower felt 10 has a through-hole at a respective center portion, and each through-hole extends in an axial direction of each of the upper felt 9 and the lower felt 10. The shaft 21 of the cymbal stand 2 is inserted into the through-hole of the upper felt 9 and the through hole of the lower felt 10. The bored hole 11 that extends in an axial direction of the cymbal 1 is formed at the center of the cymbal 1. The shaft 61 of the base 6 is inserted in the bored hole 11 of the cymbal 1, while the shaft 21 of the cymbal stand 2 is inserted in the inner through hole 66 of the base 6. To assemble the cymbal instrument, first the base 6 is immovably fixed to the cymbal stand 2 by the screw 8, as discussed above. Then, on top of the flange 65 of the base 6 is the lower felt 10, and then the sensor board 4 with the bearing 4 being fixed. The cymbal 1 and the upper portion 9 are placed on top of the sensor board 4, and then by screwing a wing nut 12, components are mounted together on the shaft 21 of the cymbal stand 2. The cymbal 1, the upper felt 9 and the lower felt 10 are arranged so that they are allowed to rotate in the circumferential direction and to move in a direction in which the shaft 61 extends and along the shaft 61.

To exchange the sensor board 4, after unscrewing the wing nut 12, the upper felt 9, the cymbal 1, and the sensor board 4 are removed. Then, a new sensor board 4 is attached to the cymbal shaft 21 together with the cymbal 1 and the upper felt 9, and then all components are mounted together on the shaft 21 by screwing the wing nut 12 as explained above. Here, the wing nut 12 is used to mount the components. However, other types of screws may be used. Further, it is also possible to replace the base 6 depending on a size of the cymbal 1.

Other Aspects

In the embodiment, a combined area of the sensor board 4 and the bearing 5 is equal to or less than a predetermined value in a plan view. In this application, the predetermined value is one fourth of an area of the cymbal 1 in the plan view. The predetermined value is determined in considering an effect of the sensor board 4 to a sound generated by a strike of the cymbal 1. When the combined area of the sensor board 4 and the bearing 5 exceeds the predetermined value, the sound generated by the striking of the cymbal 1 resounds and a quality of the sound lessens.

Figure 5:
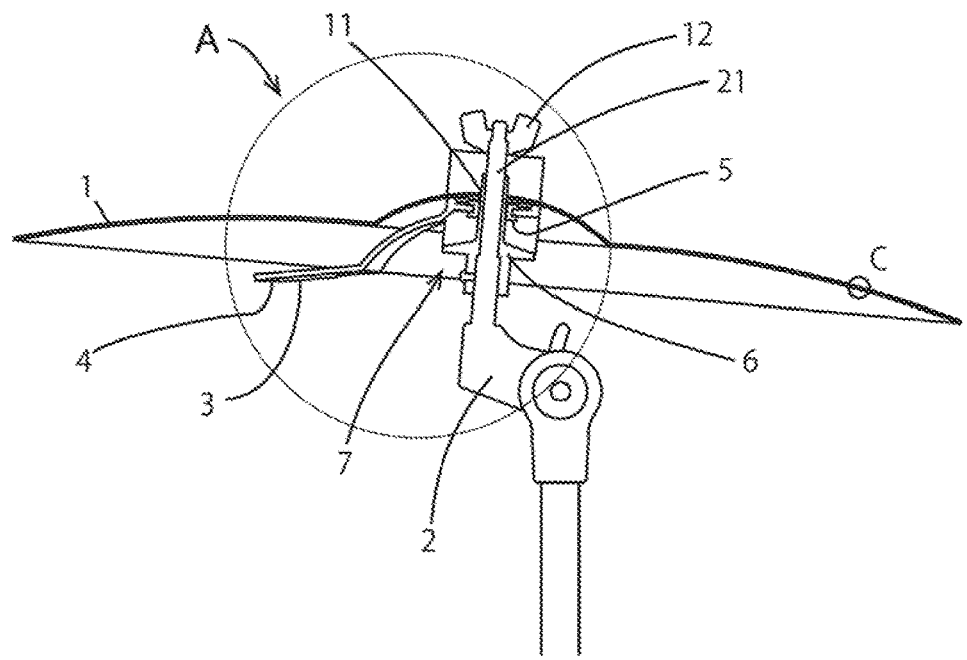
FIG. 5 is a side view showing the cymbal, the sensor unit and the cymbal stand.

As shown in FIGS. 5 and 15, the sensor 3 is attached to the sensor board 4 so that the sensor 3 and the flat plate 43 cannot be seen from a top. Thus, it is possible to prevent an occurrence of striking the cymbal 1 or the flat plate 43 by mistake while performing. In addition, the sensor 3 is disposed adjacent to a center of the cymbal 1, and thus the sensor 3 detects the vibration of the cymbal 1 where there is little up and down movement of cymbal 1, thereby assuring a steady detection of the vibration. The location where the sensor 3 is fixed to the sensor board 4 is optionally selected. The sensor 3 may be fixed to any place of the flat plate 43. By selecting an angle between the disk portion 41 and connecting plate 44, and an angle between connecting plate 44 and the flat plate 43, it is possible to select an optimal distance between the sensor 3 and the cymbal 1 in both horizontal and vertical directions. Further, using the connecting plate 44 allows a constant space to be maintained between the lower surface of the cymbal 1 and the sensor board 4, including the sensor 3. Thus, the sensor board 4 and the sensor 3 do not disturb the movement of the cymbal 1.

Further, the disk portion 41, the connecting plate 44 and the flat plate 43 may be integrally formed as a single piece member. For example, the disk portion 41, the connecting plate 44, and the flat plate 43 can be integrally formed by a molding method. Alternatively, the connecting plate 44 and the flat plate 43 may be formed integrally as a single member and then fixed to the disk portion 41.

The above embodiment shows that the sensor unit 7 is used for an acoustic cymbal made of metal. However, the sensor unit 7 may be used for other types of cymbals such as a cymbal for practice, which is made of resin and other materials.

Further, the above embodiment shows that each of upper felt 9 and the lower felt 10 has the density of between 20-40 g/cm$^3$. However, the sensor unit 7 may be used with the upper felt and the lower felt which have different density. Further, the sensor unit 7 can be used with any flexible elements as long as they have more flexibility and elasticity than the sensor board 4, the base 6, the cymbal 1 and the cymbal stand 2.

A Second Embodiment

Figure 16:
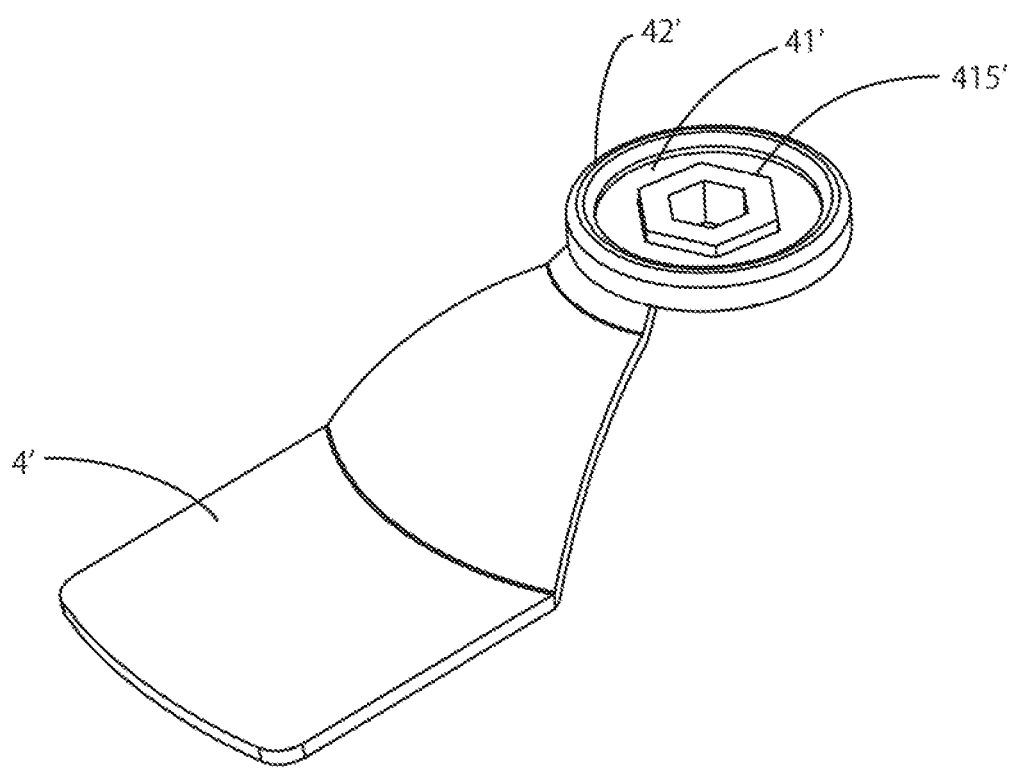
FIG. 16 shown another embodiment of the sensor board.

The above embodiment shows that the sensor board 4 and the bearing 5 are different elements, and they are attached to each other. However, as shown in FIG. 16, the bearing portion 415' and the sensor board 4' may be formed integrally as a single member. For example, this could be done by molding. Thus, the sensor unit is formed by the sensor board 4', the sensor 3 and the base 6. In this embodiment, because the bearing portion 415' is a part of the sensor board 4', it is not necessary to attach the bearing portion 415' to the sensor board 4'. Thus, the sensor board 4' is easily attached to the shaft 61 of the base 6. Further, the disk portion 41' of the sensor board 4' includes the annular shaped contact area 42', which always contacts the cymbal 1, and the bearing portion 415' which supports the shaft 61 of the base 6. Thus, a single member of the disk portion 41' performs two different functions: contacting and supporting the cymbal 1 and supporting the shaft 61 of the base 6. In this embodiment, a material of the bearing portion 415' may be limited due to a molding technology. However, other structures of the above discussed embodiment may be also used for this embodiment. For example, the annular shaped protrusion 45, the through hole 53 of the bearing 5 and the shaft 61 of the base 6, of the first embodiment, are used in this embodiment.

While specific embodiments of the invention have been shown and described in detail to illustrate the application of the principles of the invention, it is understood that the invention may be embodied otherwise without departing from such principles. For example, the cymbal is used to explain the principles of the invention. However, the structures and the principles of the invention can also be applied to other apparatuses in other fields. It is further understood that the invention is not limited to the specific embodiments described herein, but is defined by the appended claims.

I claim:

1. A sensor unit that is configured to be used for detecting a vibration of an object that is supported by a stand, comprising:

a sensor board having a contact area, the contact area being configured to contact a lower surface of the object when the sensor board and the object are attached to the stand;

a sensor that is fixed to the sensor board, the sensor being configured to detect the vibration of the object when the object is struck, the sensor being configured to receive a cable through which the detected vibration is transmitted;

a bearing that is fixed to the sensor board and has a through-hole; and a base that is configured to be detachably fixed to the stand, the base having a shaft that extends upward and is inserted in the through-hole of the bearing;

wherein an outer configuration of the through-hole of the bearing is configured to substantially correspond to an outer configuration of the shaft of the base.

2. The sensor unit according to claim 1, wherein when viewed in a plan view, the shaft of the base has a polygonal shape, and the through-hole of the bearing has a polygonal shape.

3. The sensor unit according to claim 2 wherein the shaft of the base has i) a hexagonal shape, ii) a pentagonal shape, or iii) a square shape, and the through-hole of the bearing has a) a hexagonal shape, b) a pentagonal shape, or c) a square shape, correspondingly.

4. The sensor unit according to claim 1 wherein the outer configuration of the shaft of the base has a convex portion or a concave portion, and the outer configuration of the through-hole of the bearing has i) a concave portion that is configured to receive the convex portion of the shaft when the shaft of the base is inserted in the through-hole of the bearing, or ii) a convex portion that is configured to be inserted in the concave portion of the shaft when the shaft of the base is inserted in the through-hole of the bearing.

5. The sensor unit according to claim 1, wherein the sensor board has a protrusion which extends upwards, the protrusion having an annular shape when viewed from a top perspective, and an upper surface of the annular shaped protrusion serves as the contact area and is configured to contact the lower surface of the object when the sensor board and the object are attached to the stand.

6. The sensor unit according to claim 5, wherein the sensor board comprises (i) a disk portion, (ii) a flat plate, and (iii) a connecting plate that connects the disk portion and the flat plate, the sensor is fixed to the flat plate, the annular shaped protrusion is formed on the disk portion, and the bearing is fixed to an inner edge of the disk portion, the inner edge of the disk portion being disposed to surround the bearing.

7. The sensor unit according to claim 6, wherein a combined area of (i) the disk portion, (ii) the flat plate, (iii) the connecting plate and (iv) the bearing, is equal to or less than a predetermined value when viewed in a plan view.

8. The sensor unit according to claim 5, wherein the bearing is made of a material that is more flexible than the sensor board, and the bearing has a groove into which an edge of the sensor board is inserted, such that the bearing is detachably fixed to the sensor board.

9. The sensor unit according to claim 8, wherein the bearing has a hardness which is limited to only within a predetermined hardness.

10. A sensor unit that is configured to be used for detecting a vibration of an object that is supported by a stand, comprising:

a sensor board having a contact area, the contact area being configured to contact a lower surface of the object when the sensor board and the object are attached to the stand;

a sensor that is fixed to the sensor board, the sensor being configured to detect the vibration of the object when the object is struck, the sensor being configured to receive a cable through which the detected vibration is transmitted;

a bearing that is fixed to the sensor board and has a through-hole; and a base that is configured to be detachably fixed to the stand, the base having a shaft that extends upward and is inserted in the through-hole of the bearing;

wherein:

an outer configuration of the through-hole of the bearing is configured to substantially correspond to an outer configuration of the shaft of the base, and the bearing is made of a material that is more flexible than the sensor board.

11. The sensor unit according to claim 10, wherein the bearing has a hardness which is limited to only within a predetermined hardness.

12. The sensor unit according to claim 10, wherein when viewed in a plan view, the shaft of the base has a polygonal shape, and the through-hole of the bearing has a polygonal shape.

13. The sensor unit according to claim 12 wherein the shaft of the base has i) a hexagonal shape, ii) a pentagonal shape, or iii) a square shape, and the hole of the bearing has a) a hexagonal shape, b) a pentagonal shape, or c) a square shape, correspondingly.

14. The sensor unit according to claim 10 wherein the outer configuration of the shaft of the base has a convex portion or a concave portion, and the outer configuration of the through hole of the bearing has i) a concave portion that is configured to receive the convex portion of the shaft when the shaft of the base is inserted in the through-hole of the bearing, or ii) a convex portion that is configured to be inserted in the concave portion of the shaft when the shaft of the base is inserted in the through-hole of the bearing.

15. The sensor unit according to claim 10, wherein the sensor board has a protrusion which extends upwards, the protrusion having an annular shape when viewed in a plan view, and an upper surface of the annular shaped protrusion serves as the contact area and is configured to contact the lower surface of the object when the sensor board and the object are attached to the stand.

16. The sensor unit according to claim 15, wherein the sensor board comprises (i) a disk portion, (ii) a flat plate, and (iii) a connecting plate that connects the disk portion and the flat plate, the sensor is fixed to the flat plate, the annular shaped protrusion is formed on the disk portion, and the bearing is fixed to an inner edge of the disk portion, the inner edge of the disk portion being disposed to surround the bearing.

17. The sensor unit according to claim 16, wherein
a combined area of (i) the disk portion, (ii) the flat plate, (iii) the connecting plate and (iv) the bearing, is equal to or less than a predetermined value when viewed in a plan view.

18. A sensor unit that is configured to be used for detecting a vibration of an object that is supported by a stand, comprising:
a sensor board having a protrusion and a through-hole;
a sensor that is fixed to the sensor board, the sensor being configured to detect the vibration of the object when the object is struck, the sensor being configured to receive a cable through which the detected vibration is transmitted; and
a base that is configured to be detachably fixed to the stand, the base having a shaft that extends upward and is inserted in the through-hole of the sensor board;
wherein the protrusion has an annular shape when viewed in a plan view, and
an upper surface of the annular shaped protrusion is configured to contact a lower surface of the object when the sensor board and the object are attached to the stand.

19. The sensor unit according to claim 18, wherein
an outer configuration of the through-hole of the sensor board is configured to substantially correspond to an outer configuration of the shaft of the base such that (i) the shaft of the base is movable in the trough hole of the sensor board along a direction in which the through-hole extends and (ii) the sensor board does not rotate with respect to the shaft of the base when the shaft of the base is inserted in the through-hole of the sensor board.

20. The sensor unit according to claim 19, wherein
the annular shaped protrusion is disposed to surround the through-hole of the sensor board, and
a center of the annular shaped protrusion is located along an axis of the shaft of the base.

* * * * *